March 22, 1932.  C. H. FOX  1,850,075

BOOSTER VALVE FOR PUMP MECHANISM

Filed Nov. 14, 1930  2 Sheets-Sheet 1

INVENTOR
CHARLES H. FOX.
BY
ATTORNEY

March 22, 1932. C. H. FOX 1,850,075
BOOSTER VALVE FOR PUMP MECHANISM
Filed Nov. 14, 1930 2 Sheets-Sheet 2

INVENTOR
CHARLES H. FOX.
BY
ATTORNEY

Patented Mar. 22, 1932

1,850,075

UNITED STATES PATENT OFFICE

CHARLES H. FOX, OF CINCINNATI, OHIO, ASSIGNOR TO THE AHRENS-FOX FIRE ENGINE COMPANY, OF CINCINNATI, OHIO, A CORPORATION OF OHIO

BOOSTER VALVE FOR PUMP MECHANISM

Application filed November 14, 1930. Serial No. 495,654.

This invention relates to improvements in booster valves, or adapters, for use in connection with a rotary fire engine pump.

It is the object of this invention to provide in connection with a booster tank, means for admitting auxiliary hydrant water to the pump for the purpose of supplying water to the pump after the water in the booster tank has become practically exhausted.

It is also an object of this invention to provide in connection with an auxiliary supply of water a means for replacing the water exhausted from the booster tank and refilling the tank.

These and other objects and advantages will appear from the following description taken in connection with the drawings.

Referring to the drawings.

Figure 1:
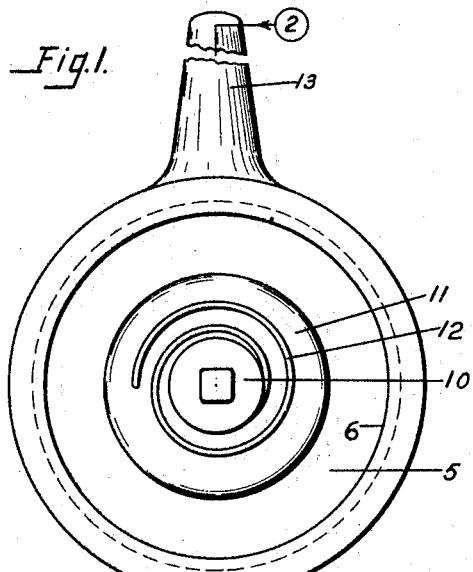
Figure 1 is an elevation of the booster valve showing the outlet end.
Figure 2:
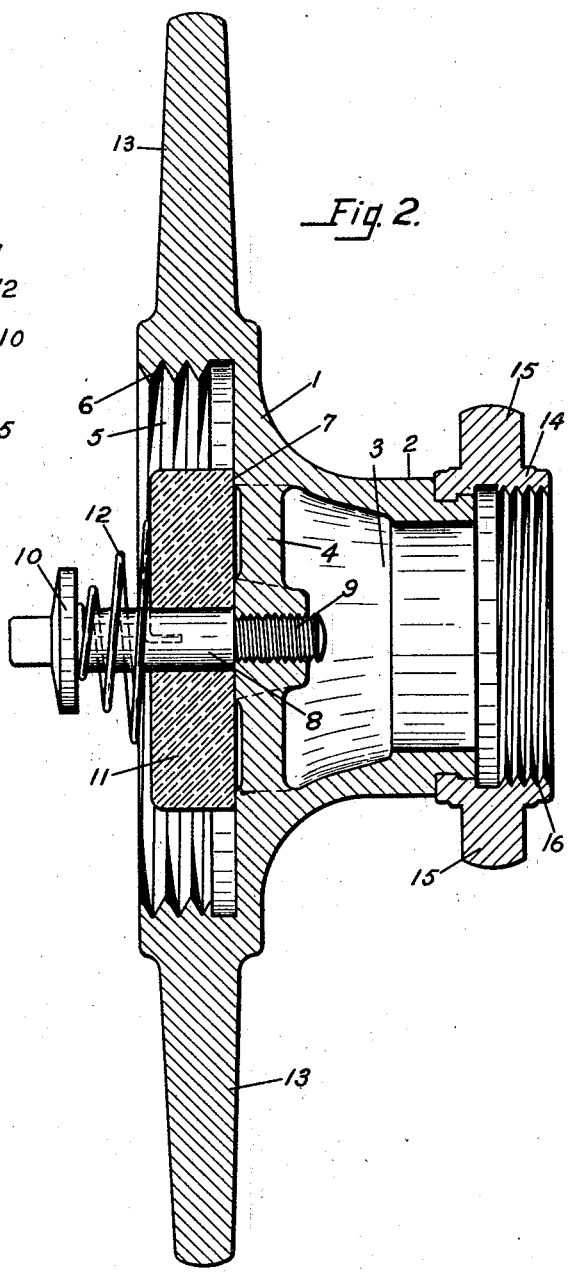
Figure 2 is a section on the line 2—2 of Figure 1.
Figure 3:
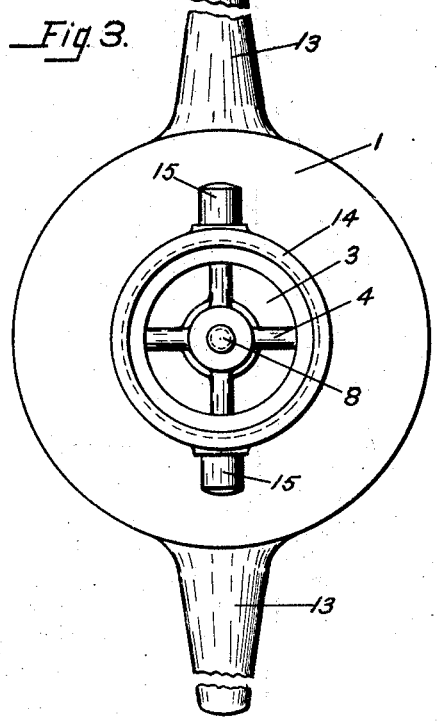
Figure 3 is a side elevation of the booster valve showing the inlet end thereof.

The body of the adapter or booster valve is indicated by the numeral 1 and has extending from one side thereof a cylindrical projection 2, which has an opening 3 extending entirely through the body 1. Within the opening 3 is a spider member 4 adapted to support the valve structure to control the passage of fluid through the body. In the exit side of the body is a cavity 5 which is screw threaded at 6 to receive the male threaded end of the pump intake. In the lower part of this cavity 5 is a valve seat 7 adapted to provide a close fitting seat for a valve member, later to be described. In the central part of the spider there is mounted therein a stem 8 by means of screw threads 9. On the outer end of the stem 8 is a head 10 adapted to bear the pressure of one end of a spring. On this stem 8 and slidably supported thereby against the valve seat is a rubber valve member 11. Between the valve member 11, which is adapted to glide along the stem 8, and the head 10 is a coil spring 12. One end of this coil fits within the valve member 11 while the other end engages against the head 10 so that under normal conditions of pressure the valve is held against the valve seat keeping the passageway through the body closed. For the purpose of operating and rotating the body member for properly placing upon the intake end of the pump, handles 13 are provided. In the present instance there are two of these handles, but any number may be used. On the intake end of the projection 2 is a swivel nut 14 which has extending therefrom lugs 15 for the purpose of either holding the nut against rotation or rotating the nut when it is so desired. This nut has threads to engage the threads on the end of a regular two and a half inch hose. When this attachment is to be used it is placed upon the fire engine in the position shown by the numeral 17 of Figure 4. In order to attach the nut 14 to the hose the end of the hose is threaded into the threads 16 either by rotating the hose or by rotating the nut. The end of the hose remote from the nut 14 is attached to the hydrant, or some other suitable source of water.

Figure 4:
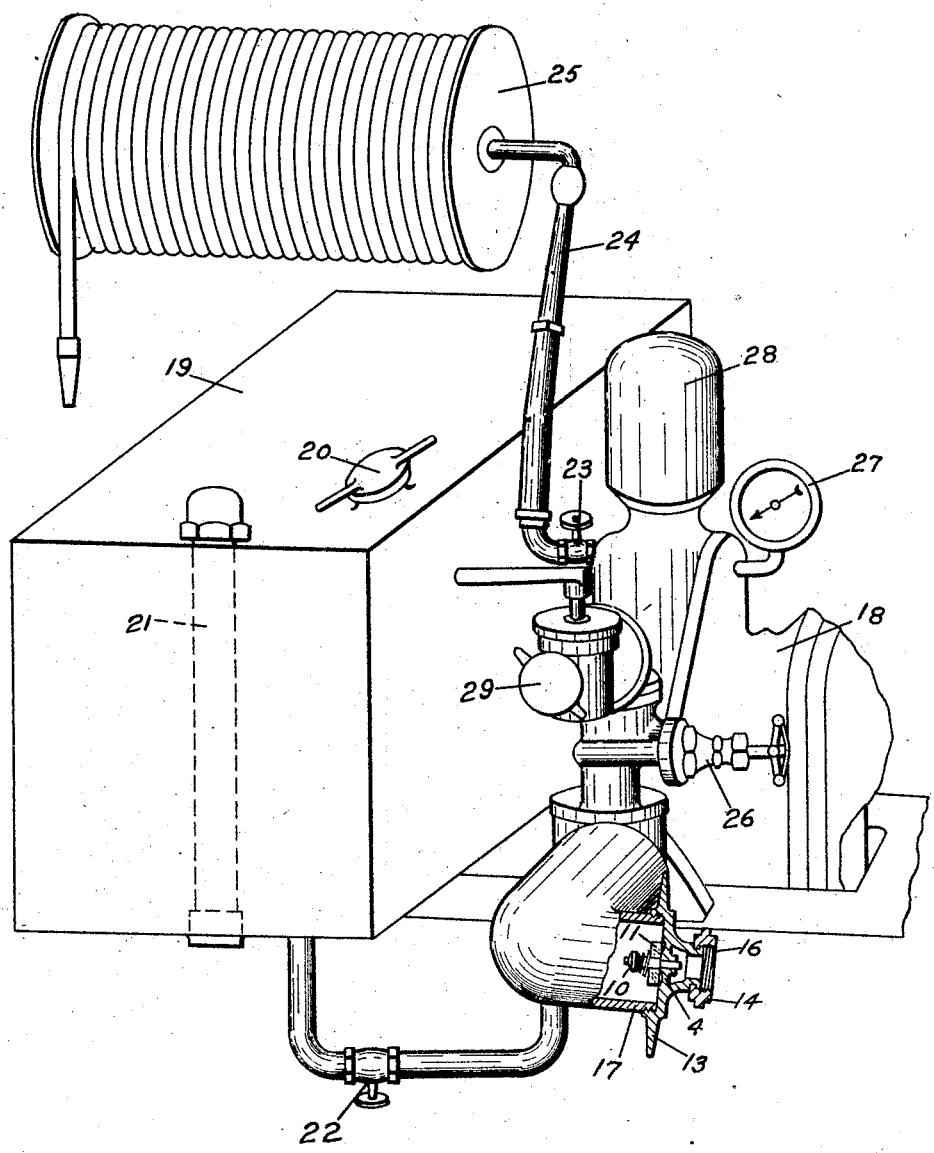
Figure 4 is a view showing the whole booster fire extinguishing system with the booster valve, or adapter, attached thereto.

Figure 4 shows the general system of the booster fire extinguisher. As shown in this figure the rotary engine pump is indicated by the numeral 18 and is to be mounted upon some suitable part of the chassis of the fire engine. This booster system may be attached to any fire engine. In order to supply the water for extinguishing small fires, there is provided in addition to other parts of the fire extinguishing mechanism, a tank 19 located adjacent the pump at some suitable point on the engine chassis. This tank is known as the "booster tank" and also provides in the upper part thereof a filler spud 20 by which the tank may be filled without using the pump. There is also provide in the tank an overflow 21. This overflow is situated so that whenever the tank is filled the water will pass down through the pipe out of the bottom and be discharged. By this means the fact that the tank is filled is indicated and the filling process stopped. Extending from the lower part of the booster tank is a pipe leading to the pump mechanism. In this pipe is a valve 22 used for closing the connection between the pump and the tank so that no water may be pumped from the tank even though the pump be operating.

There is also provided on the opposite side of the pump from the valve 22 a discharge valve 23. This discharge valve leads into a tubular connection 24 between the pump and the hose reel 25 located above the tank. In the present instance the water from the connection 24 passes through the axis of the reel. The numeral 26 indicates a churn valve which is customarily associated with the fire engine of the positive displacement type. This valve serves as a by-pass when partially or fully open. When thus open any fraction of the discharge or all of the water passed by the pump can be diverted into the receiving chamber instead of finding an exit through the gates provided for that purpose. Since the volume of water passed by the booster jet is quite small as compared with that of the fire stream play with larger size fire hose, the churn valve is a necessary factor in the operation of the booster system. In practice when operating the booster line only, the churn valve is never fully closed in order that the pump may run smoothly and also without stalling. A normal discharge must be churned back to the intake side of the pump and it follows that the churn valve serves as a regulator, both as to pumping speed and pump pressures.

There is also connected to the pump the usual water or pump pressure gauge 27 for determining the pressure conditions. It is also found that in the usual air chamber 28, which has for its object the forming of an air cushion, the pulsations attended upon the influx is diminished, or evened out. 29 is used to indicate discharge gates, two or more of which are customarily attached to the fire engine pump. These gates serve to control the water sent into the large fire hose used in the regular service. The present attachment is indicated in Figure 4 by the numeral 17. This numeral indicates the attachment as a whole.

The booster tank usually contains from 80 to 100 gallons and is used for the extinguishing of small fires. In the event that the water in the tank should become exhausted it may become necessary to supply water to the pump from other sources so that the fire may be extinguished without utilizing the main fire extinguishing part of the apparatus. For this purpose applicant's adapter 17 is applied as indicated in Figure 4. The adapter is attached to an intake on the pump. One end of the hose is attached to the swivel nut 14 while the other end of the hose is attached to a hydrant. The valve 11 is kept closed or seated by pressure within the suction chamber and opens inwardly automatically when the hydrant pressure is turned on to reenforce the water supply. When the water supply is reenforced the hydrant water not only passes to the pump but also passes back through valve 22 into the booster tank, again filling this tank. When the booster tank becomes full it is indicated by the water dropping through the overflow when the valve 22 is closed. After this the hydrant water is used for putting out fires the same as if the water were being taken from the booster tank. The particular advantage of this apparatus is that it may be used for putting out small fires as effectively as a larger stream of water would without exhausting or unnecessarily using the water supply and without incurring a large amount of damage to property by an unnecessary use of water.

It will be understood that I desire to comprehend within my invention such modifications as may be clearly embraced within the scope of my claims and invention.

Having thus fully described my invention, what I claim as new and desire to secure by Letters Patent, is:

1. In a pump mechanism, in combination with a pump and a temporary water supply connected to the intake side of the pump, means to connect the intake side of the pump to another water supply, said means including a pressure operated valve.

2. In a pump mechanism, in combination with a pump and a temporary water supply connected to the intake side of the pump, means to connect the inlet side of the pump to another water supply, said means including a spring-closed and pressure-opened valve and a connection for said other water supply.

3. In a pump mechanism, in combination with a pump and a temporary water supply connected to the intake side of the pump, a valve structure having a pressure operated valve therein attached to the intake side of the pump and means for forming a connection between the valve structure and another water supply.

4. In a pump mechanism, in combination with a pump and a temporary water supply connected to the intake side of the pump, a valve structure having a spring-closed and a pressure-opened valve therein attached to the intake side of the pump and means for forming a connection between the valve structure and another water supply.

5. In a pump mechanism, in combination with a pump and a temporary water supply connected to the intake side of the pump, a valve structure having a valve therein attached to the intake side of the pump and means for forming a connection between the valve structure and another water supply, said valve adapted to be closed by pressure from the temporary water supply and opened by pressure from the other water supply after said connection is formed.

In testimony whereof, I affix my signature.

CHARLES H. FOX.